United States Patent [19]

Kramer

[11] 4,142,816

[45] Mar. 6, 1979

[54] BREAKWATER INTERCONNECTING DEVICE

[75] Inventor: James H. Kramer, Akron, Ohio

[73] Assignee: The B. F. Goodrich Company, Akron, Ohio

[21] Appl. No.: 874,100

[22] Filed: Feb. 1, 1978

[51] Int. Cl.² .................... E02B 3/04; F16C 11/06
[52] U.S. Cl. ..................................... 405/26; 405/27; 405/33; 403/56; 403/141; 403/143
[58] Field of Search ............... 61/5, 38; 403/56, 141, 403/143, 133, 64

[56] References Cited

U.S. PATENT DOCUMENTS

| 3,978,276 | 8/1976 | Poffenberger | 403/141 X |
| 4,023,370 | 5/1977 | Watson | 61/5 |

FOREIGN PATENT DOCUMENTS

| 664804 | 12/1965 | Belgium | 403/143 |
| 58205 | 10/1967 | German Democratic Rep. | 403/56 |
| 1328077 | 4/1963 | France | 403/56 |

Primary Examiner—Jacob Shapiro
Attorney, Agent, or Firm—Joseph Januszkiewicz

[57] ABSTRACT

An interconnecting device for use with a plurality of spaced floating breakwater columns comprising a plurality of spaced spherical elements wherein each element is encompassed by a pair of flanged hemispherical plate members. A hollow rubber spherical member is secured to the interior surface of the hemispherical plate members and abuttingly engages the spherical element. A pair of plate members interconnect the flanged hemispherical plate members to provide an integral assembly unit with the rubber element providing resiliency. Each spherical element has an outwardly projecting hub that is flanged to permit its attachment to the breakwater columns.

7 Claims, 4 Drawing Figures

BREAKWATER INTERCONNECTING DEVICE

BACKGROUND OF THE INVENTION

This invention relates to a floating breakwater and more particularly to an interconnecting device for a floating breakwater.

The use of breakwaters is important in several aspects such as minimizing the erosion of shorelines caused by the action of waves and the stabilization of structures in waters having turbulent waves.

The structures that are in the turbulent waters such as breakwaters and semi-permanent installations must absorb or dissipate a tremendous amount of energy in dampening and arresting the waves. It is a known fact that sections of stone and concrete breakwaters weighing more than 1,000 tons have been moved by the forces produced by waves. Structures that are installed in such turbulent waters which can yield sufficiently to absorb and dissipate the wave energy forces have become increasingly more important since these structures can be used with breakwater structures and platform structures associated with the ever increasing use of off-shore drilling platforms and their accompanying facilities. The present invention provides an interconnecting device between columns or piers that permits a limited deflection (rotational and translational) in a three-dimensional plane.

SUMMARY OF THE INVENTION

The present invention contemplates a device that interconnects a plurality of spaced breakwater piers or columns wherein the device permits limited rotational and torsion movement between the respective breakwater columns. Each device includes a hollow rubber spherical element that encompasses a spherical element that has a protruding flanged hub for connection to the breakwater columns. The rubber elements are clamped between hemispherical plate members that are held together as a unit by a spider means.

DETAILED DESCRIPTION

Figure 1:
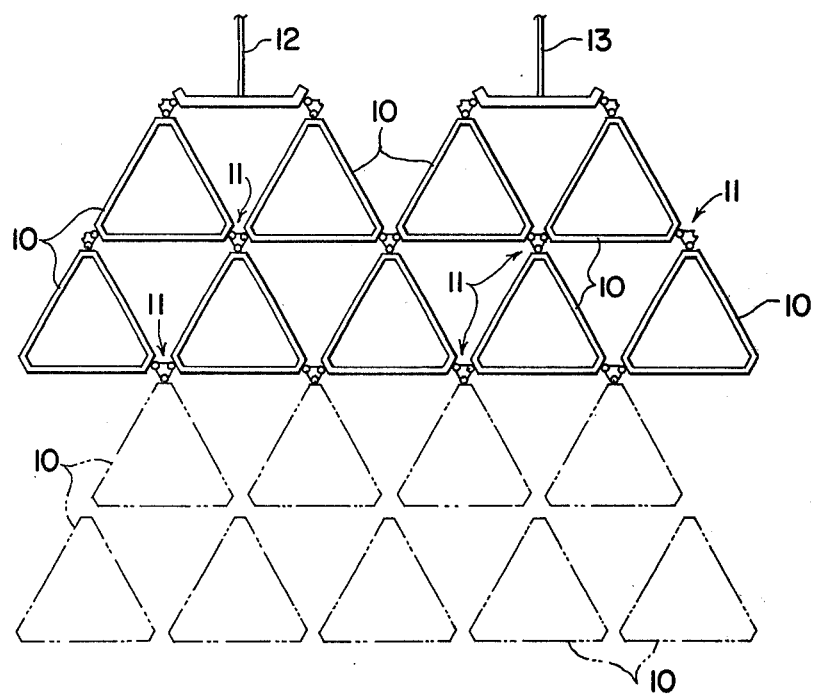
FIG. 1 is a general plan view of a breakwater structure utilizing the present invention.

Referring now to the drawings, wherein like reference numerals designate like or corresponding parts throughout the several views, there is shown in FIG. 1 a plurality of spaced concrete piers or column 10. The piers 10 are elongated masses of concrete or steel that are triangular in cross-sectional shape and are interconnected by connecting devices 11. The number of piers 10 may vary in accordance with the desired area to be protected. As shown in FIG. 1, the end piers 10 are connected by a line 12 and 13 to suitable anchors or to a stationary support where desired or necessary.

Figure 2:
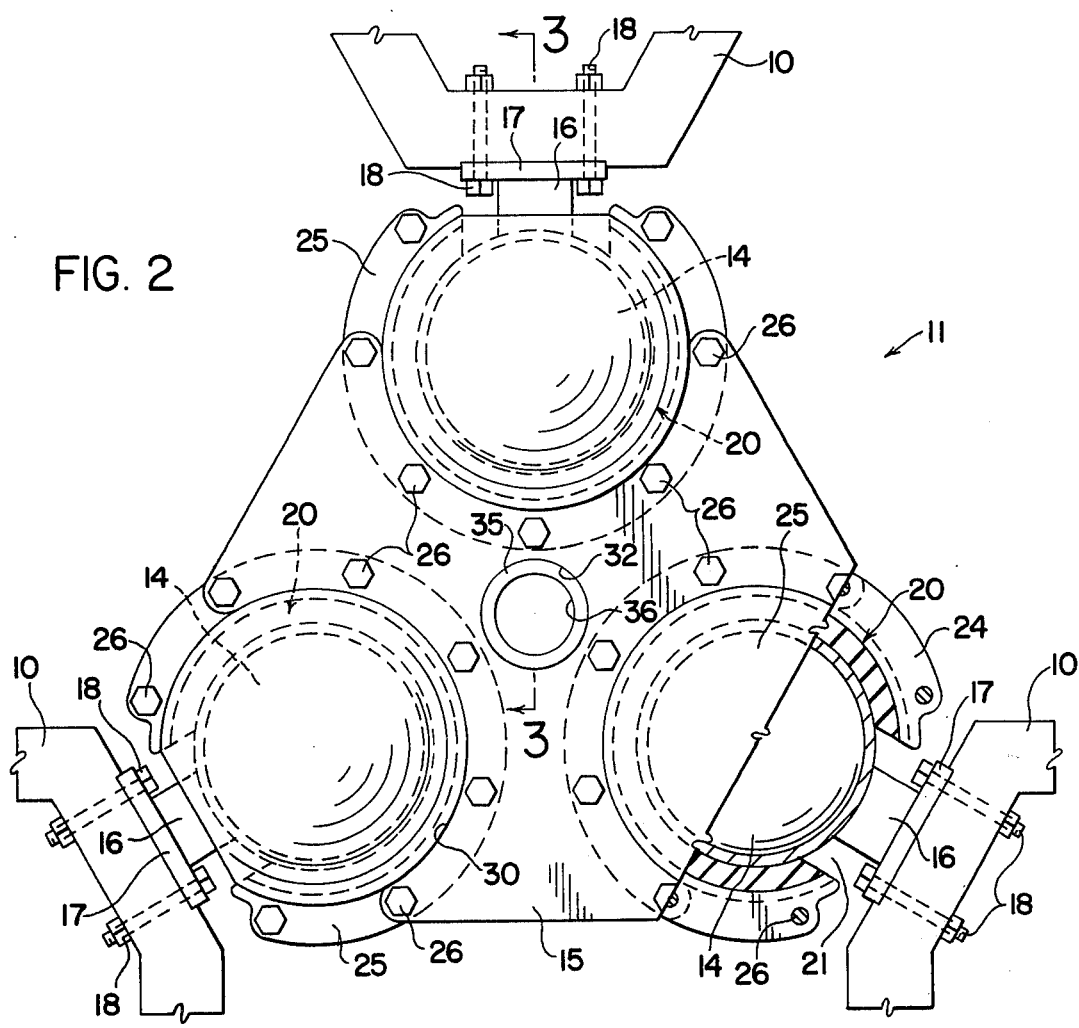
FIG. 2 is an enlarged plan view with a portion broken away of an interconnecting device used in the breakwater structure of FIG. 1.
Figure 3:
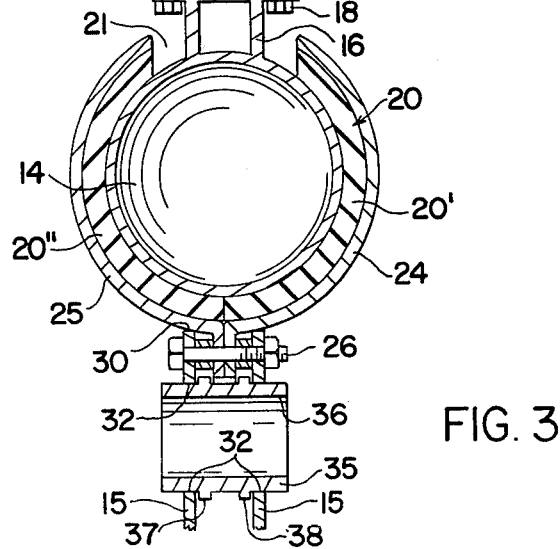
FIG. 3 is a cross-sectional view of an interconnecting device taken along line 3—3 of FIG. 2.

Each connecting device 11 for the columns 10 has three spherical elements 14 interconnected by flanged connectors or spiders 15. Each spherical element 14 is teflon coated and has a hub 16 extending outwardly therefrom, terminating into an end flanged plate 17. Flanged plate 17 has a plurality of circumferentially spaced bores which receive suitably bolts 18 for connecting the device 11 to the piers or columns 10 as shown in FIG. 2. A hollow spherical rubber member 20 emcompasses each of the spherical elements 14, with a clearance space 21 between the hub 16 and the annular rubber element 20 to facilitate the movement of connecting device without interference. The rubber element 20 is encompassed by two flanged hemispheres 24 and 25 which are interconnected by suitable bolt means 26. The hollow spherical rubber element 20 is split into two halves and molded directly to the flanged hemispheres 24 and 25 respectively. The three adjacent flanged hemispheres as shown in FIG. 2 are interconnected between two spiders or flanged connectors 15 (only one shown in FIG. 2). The spiders are flat plate members with circular recesses as at 30 to accommodate the spherical elements 14 and their respective flanged hemispheres. The spiders 15 are connected to the flanged hemispheres 24 and 25 by the bolt means 26. The central portion of each spider 15 has a central recess 32 which receives a hub 35 that has a central recess 36 to facilitate the fastening of special lines to the assembly. The hub 35 has a pair of annular rings 37 and 38 on its outer surface which facilitate the clamping of the hub 35 by the pair of spaced spiders 15 as shown in FIG. 3.

The interconnecting device 11 lends itself readily to replacement and repair at the site of its use without the need to resort to cutting, burning, concrete pouring or welding which such other action would require the destruction and rebuilding of existing structures and components. The device 11 permits rotation about the vertical axis, and rotation about a horizontal axis. The degree of rotation is only limited by the clearance space provided between the members.

Figure 4:
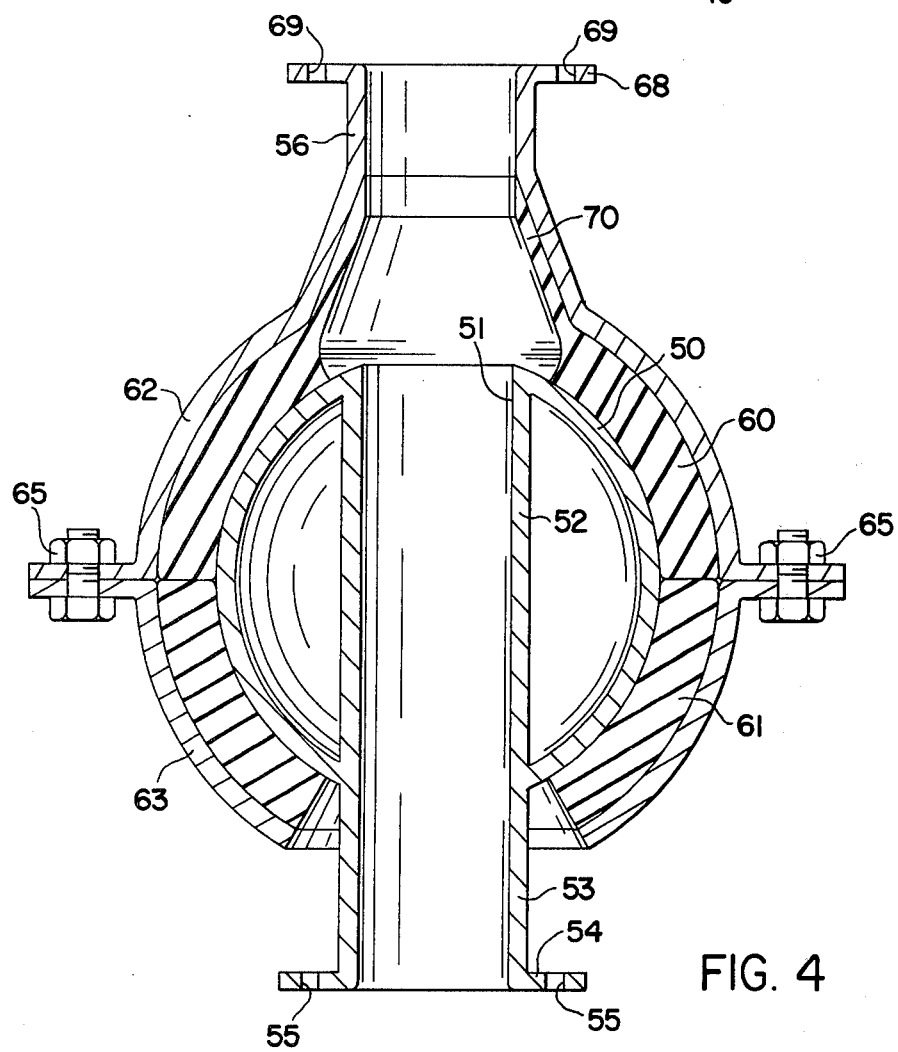
FIG. 4 is a cross-sectional view of a modified form of the invention.

A modification of the described invention is shown in FIG. 4 wherein the interconnecting device is modified to encompassing a hollow pipe joint to permit the passage of fluids which permit a rotation and a torque about the parts that make up the interconnecting joint assembly.

The interconnecting device is a joint assembly which includes a hollow spherical element 50 that has a central bore 51 made by a hollow tube 52 that extends centrally therethrough and is integral therewith. Tube 52 extends outwardly therefrom as a hub 53 with a flanged portion 54. Flanged portion 54 has a plurality of circumferentially spaced bores 55 that facilitate the connecting of the joint assembly to adjacent structures. A hollow spherical rubber member consisting of two hollow hemispheres 60 and 61 encompasses the spherical element 50 except for a clearance space provided around hub 53 and at its opposite end of the sphere in a manner to be further described. Encompassing the respective hemispheres 60 and 61 are flanged hemispheres 62 and 63 respectively which hemispheres 62 and 63 have their inner peripheral surfaces bonded to the respective rubber hemispheres 60 and 61. The respective one ends or the flanged ends of hemispheres 62 and 63 are bolted together by a plurality of circumferentially spaced bolts 65. The other end of flanged hemisphere 62 extends outwardly as a tubular member 56 with a flanged portion 68, which flanged portion has a plurality of circumferentially spaced bores 69 to facilitate the attachment to another structure. The rubber hemisphere 60 adjacent to such other end of hemisphere 62 tapers down to a reduced, necked-down tubular portion 70.

The joint assembly thus described discloses a pair of spaced tubular members: 53–52 (hub 53 and hollow tube 52) being one such member and 56–68 being the other such member whereby relative rotation and twisting can be accommodated without leakage under extreme pressures. This action is facilitated by the one tubular member 52 being moveable by spherical element 50 relative to the pair of hemispherical elements 62 and 63 which forms the support for the adjacent conductive tubular member 56.

It will be apparent that, although a specific embodiment and a certain modification of the invention have been described in detail, the invention is not limited to the specifically illustrated and described constructions since variations may be made without departing from the principles of the invention.

I claim:

1. An interconnecting device for a breakwater comprising a pair of spaced tubular members operative to conduct fluid from one tubular member to the other of said tubular members, said one tubular member having one end integral with a spherical ball element, said one tubular member extends centrally through said spherical ball element for communication with the other one of said tubular members, a flange on the other end of said one tubular member, a pair of interconnected hemispherical flanged members encompassing said spherical ball element, a hollow spherical rubber member integral with said pair of hemispherical flanged members abuttingly contacting said spherical ball element, and one of said hemispherical flanged members having said other tubular member integral therewith for communication with said one tubular member.

2. An interconnecting device as set forth in claim 1 wherein said spherical element is coated with teflon.

3. An interconnecting device as set forth in claim 2 wherein said hollow spherical rubber member is composed of two halves, and each of said rubber halves bonded to the interior of said flanged hemispherical flanged members.

4. An interconnecting device for a floating breakwater comprising a plurality of spaced spherical elements, each of said spherical elements having an outwardly extending hub with a flange for connection to a portion of a floating breakwater, a pair of hemispherical members encompassing each of said spherical elements, each pair of hemispherical members having complimentary flanged portions that abuttingly engage each other, a hollow spherical rubber member interposed between each pair of said hemispherical members and its encompassing spherical element for abutting contact therebetween, and flat flanged plate members interconnecting all of said flanged portions of said hemispherical members to form an integral resilient assembly.

5. An interconnecting device as set forth in claim 4 wherein said spherical elements are coated with teflon, and each of said hollow spherical rubber members are composed of two halves.

6. An interconnecting device as set forth in claim 5 wherein said rubber members are bonded to the interior of said flanged hemispherical members and each of said flanges of said hub having a plurality of circumferentially spaced bores for connecting said device to a plurality of spaced breakwater elements.

7. An interconnecting device as set forth in claim 6 wherein each of said flanged plate members have a centrally disposed bore extending therethrough that are equidistant from said spherical elements, and a hub mounted in said bores to facilitate attachment thereto.